March 1, 1949.     I. K. DORTORT     2,463,091
DIFFERENTIAL GEARING
Filed May 23, 1947     2 Sheets-Sheet 1
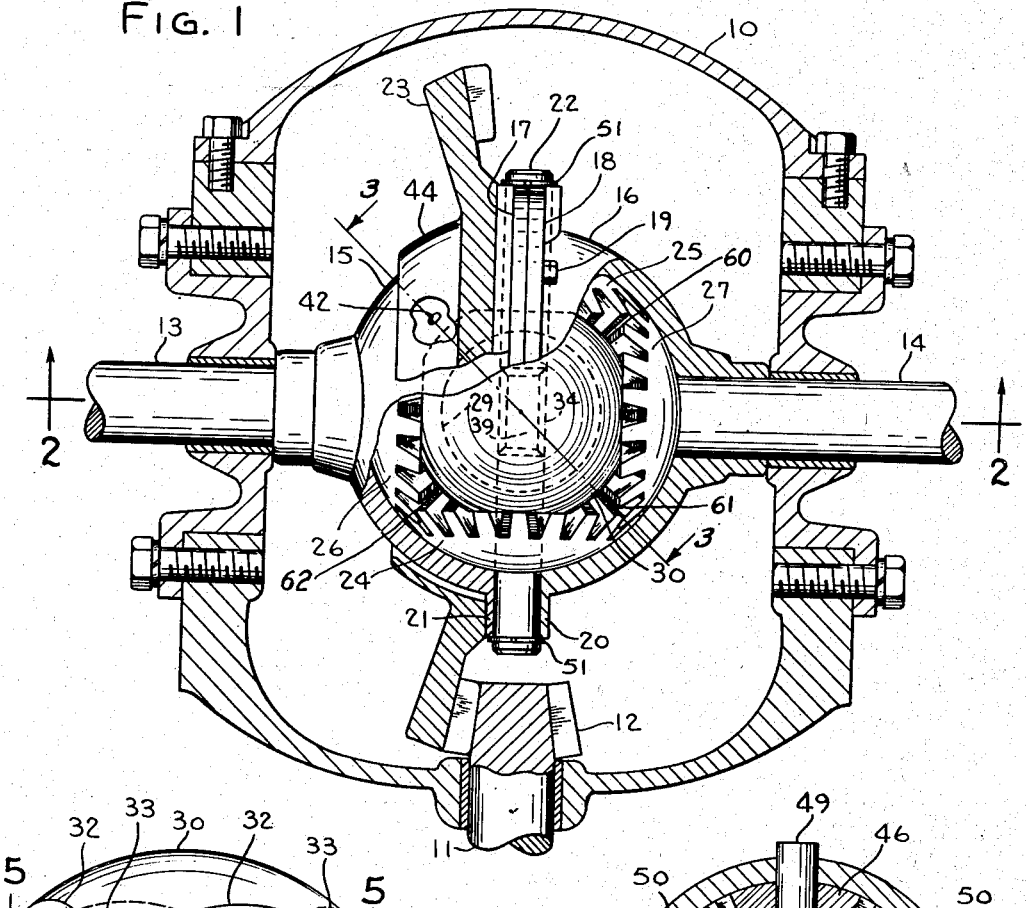
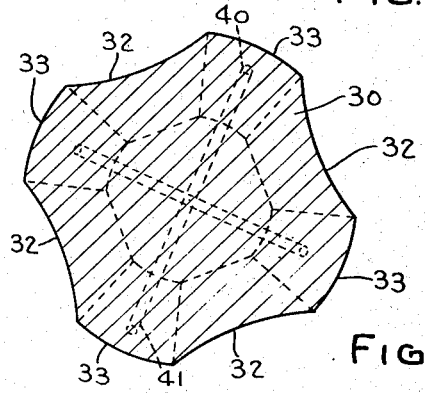
INVENTOR
ISADORE K. DORTORT
BY John W. Michael
ATTORNEY March 1, 1949.  I. K. DORTORT  2,463,091
DIFFERENTIAL GEARING
Filed May 23, 1947  2 Sheets-Sheet 2
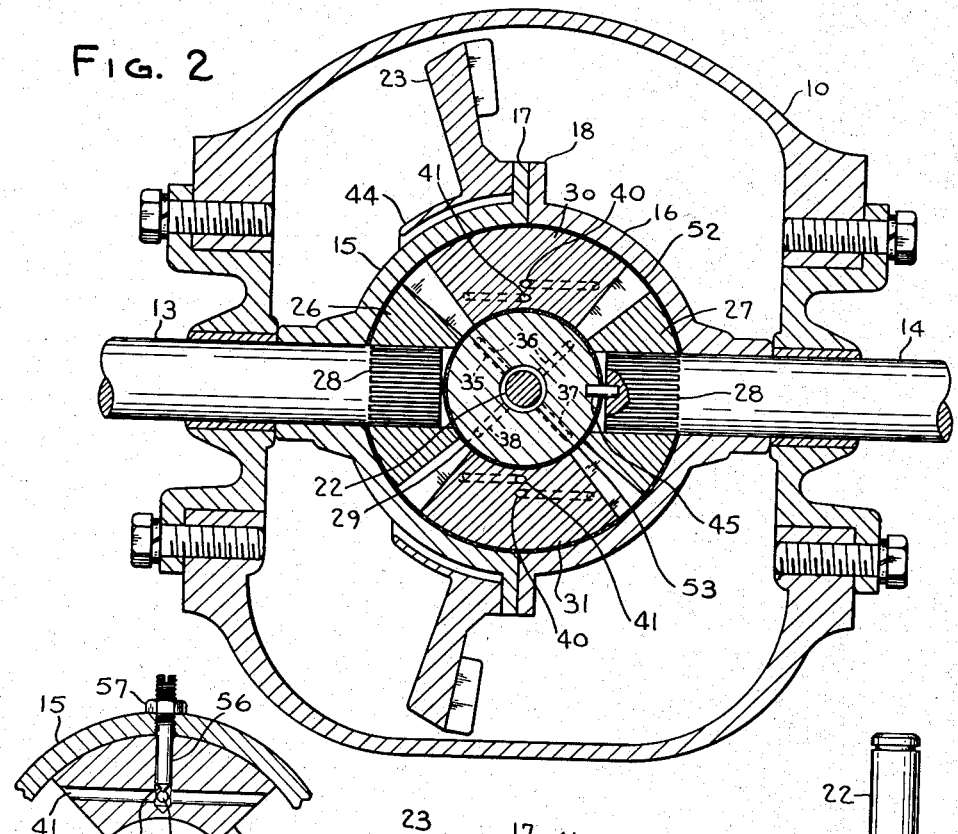
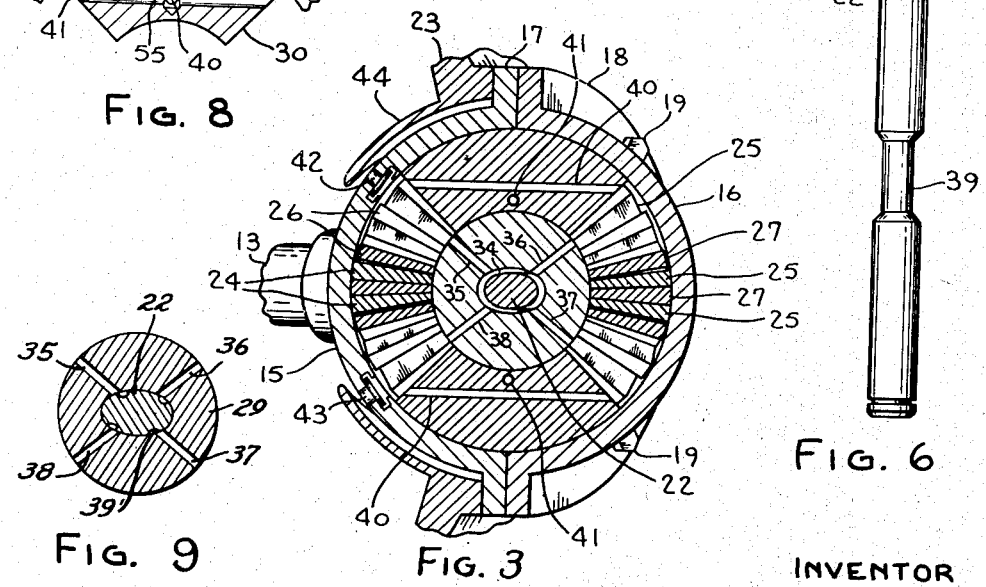
INVENTOR
ISADORE K. DORTORT
BY John W. Michael
ATTORNEY Patented Mar. 1, 1949

2,463,091

UNITED STATES PATENT OFFICE 2,463,091

DIFFERENTIAL GEARING

Isadore K. Dortort, Milwaukee, Wis.

Application May 23, 1947, Serial No. 750,103

7 Claims. (Cl. 74—711)

This invention relates to improvements in differential gearings particularly as applied to automotive vehicles, of the type adapted to automatically limit the differential action and produce counter-torques as a function of the relative rotation of the gears.

In differential gearings of the above identified type, motion of one driven gear or axle relative to another driven gear or axle, or to the planetary or coupling gears, such as occurs when one of the driven gears rotates freely, is utilized to provide a pumping action creating and applying torque to the non-rotating or more slowly rotating gear. However, the known mechanisms for accomplishing the above result have been impractical because of difficulty in manufacture, undue increase in weight of and number of parts used in the differential gearing, the need for large space in the complete machine, and too great an increase in cost over the standard differential.

One of the objects of the present invention, therefore, is to provide a differential gearing of the type indicated, which is easily manufactured with the same tools and gear cutting machinery as standard beveled gear differentials, does not weigh substantially more, take up more space, or cost much more than ordinary differential gearing of substantially the same power transmission capacity.

Another object of the invention is to apply relatively constant tractive forces to the driven wheels of a vehicle traveling on non-uniformly slippery surfaces, so as to avoid the sudden removal and application of tractive power which is a frequent cause of skidding accidents.

The stated objects are attained primarily by using the side-gears and planetary gears of a beveled gear differential, as oil pumps as well as for the mechanical transmission of power. The gears are carried in a shell which performs the same functions as in the conventional differential, and also serves as the pump casing which is divided into suction and pressure areas or chambers. In the present invention, the differential gears are used for the oil pumps, which is made practicable by placing those gears whose inner web surfaces are spherical, around a central sphere of corresponding diameter. The spaces defined or formed between the lands of the gears, the shell and the central sphere or filler block are substantially filled by outer filler blocks to separate the low and high pressure areas or chambers adjacent the arcs of interaction of the gears. The central filler block in one embodiment of the invention, has communicating passages or ports which interconnect the high and low pressure chambers through a common regulating or throttling passageway. Thus, whenever there is relative movement of the gears, oil or other fluid is forced through the central passage which is adjustably restricted so that, when relative gear motion exceeds that required for the normal turning action of the vehicle, the pressure developed produces counter-torques which limit the relative motion of the driven wheels, and make it possible for the engine to deliver tractive power even when one wheel is spinning freely and cannot exert any tractive effort.

Combining the properties of shell and pump casing in one element and utilizing the power transmission gears as pump impellers, saves in weight and number of working parts. The present invention replaces the usual spider by inner and outer filler blocks and a shaft or shafts on which planetary gears are mounted, and such structure is herein collectively called the spider. However, such spider adds but little weight to that of a similar standard differential gearing. The finished surfaces of most of the spider are cylindrical, spherical or conical, and may be easily and accurately produced by modern mass-production techniques, particularly by grinding operations. The gear teeth can be produced on the machines now commonly used to manufacture bevel gear differentials even if the tooth profile is modified to improve pumping action. The over-all space required for differential gearing so constructed does not exceed that required for a standard differential having the same power transmission factors.

The novel features, characteristic of the present invention, are set forth with particularity in the appended claims. The invention itself, however, both as to its organization and its method of operation, together with additional objects and advantages thereof, will best be understood from the following description of specific embodiments which illustrate a differential having two planetary gears, equal in size to the driven gears, such embodiment being chosen for ease of illustration and explanation. Generally, the preferred embodiment will use two, three or four planetary gears having diameters smaller than the diameter of the driven gears. Referring now to the accompanying drawings:

Fig. 1 is a view partly in horizontal section and partly in plan with parts being broken away for the sake of clarity in illustrating a differential gearing embodying the present invention;

Fig. 2 is a sectional view taken on the line 2—2 of Fig. 1;

Fig. 3 is a sectional view taken on the plane of line 3—3 of Fig. 1;

Fig. 4 is a view in side elevation of a filler block comprising one of the elements of the differential gearing embodying the invention;

Fig. 5 is a sectional view taken on the line 5—5 of Fig. 4 to illustrate that the sides of the block are concave and convex conical surfaces and not flat;

Fig. 6 is a view in side elevation of a removable shaft comprising an element of the differential embodying the invention;

Fig. 7 is a view in vertical section at right angles to the driven shafts illustrating a portion of a modification of a differential gearing embodying the invention in which there are incorporated four planetary gears;

Fig. 8 is a sectional fragment of the shell with an outer filler block and means for adjustably controlling flow through such block from exteriorly of the shell, and Fig. 9 is a sectional view similar to Fig. 2 of only the inner filler block and is shown as having placed therein a fluted shaft in place of the shaft shown in Fig. 6.

Referring to the drawings by reference numerals, the differential gearing is mounted in a housing 10 which provides a reservoir and sump for the oil which in the present embodiment of the invention, is used not only to lubricate the moving parts but also as the fluid in the pumping system. A power supplying drive shaft 11 extends into the housing 10 and rotates a driving pinion 12. A pair of coaxial driven axles 13 and 14 also extend into the housing 10. These axles are all mounted in suitable bearings, which are shown in rudimentary form only.

As is customary with standard differential gearing, a shell is rotatably mounted on the driven axles. In the illustrated embodiment of the present invention, the shell also provides a casing for the pumping means. To perform both the indicated functions, the shell is made in the shape of a hollow sphere by joining together two identically shaped halves 15 and 16. Each half has similar flanges 17 and 18 fastened together by a plurality of machine screws 19, or the like. The inner surfaces of the shell halves 15, 16 are spherical and finished to predetermined size and surface smoothness. Each of the flanges 17, 18 have bearing half portions, indicated generally at 20 and 21, diametrically positioned and respectively coacting when the halves are united, to provide bearings for the planetary gear-holding shaft 22. Each half of the shell also has suitable bearings by which the shell halves are rotatably mounted on the axles 13 and 14. The ends of the bearings in the shell halves abut the inside of the housing 10 to position the shell, or various forms of thrust bearings may be used for this purpose. A ring gear 23 is bolted to the flanges 17 and 18 and meshes with pinion 12 so that rotative power supplied by the shaft 11 is applied to the shell.

To transmit the rotative motion of the shell to the axles 13 and 14, there is provided a pair of planetary gears 24 and 25 which move with the shell in an orbit about the axes of the shafts 13 and 14, and a pair of driven gears 26 and 27 which mesh with the planetary gears 24 and 25 and are splined respectively to the shafts 13 and 14, as indicated at 28, Fig. 2. It will be apparent that the driven or side gears 26 and 27 may be provided with extended hubs journaled into the shell bearings so as to provide greater strength for the splined joint. The differential action accomplished by this arrangement is identical with that of any standard differential gearing.

However, since the gears in the above embodiment are also designed to function as pumps, the outer faces of their bodies are convex spherical surfaces and are finished to fit snugly in the inner spherical surface of the shell. The inner faces of the gear webs are finished as concave spherical surfaces to fit snugly on a sphere or filler block 29. Thus the gears and filler block 29 nest within the shell with such close tolerances of fit as to permit the gears to act properly as gear pumps. The spaces between the shell, the block 29 and the top lands of the gears are substantially filled by two identically shaped filler blocks 30 and 31 having their outer faces finished as convex spherical surfaces and the inner faces thereof are finished as concave spherical surfaces to fit snugly respectively with the inner spherical surfaces of the shell 15—16 and the outer spherical surface of the filler block 29. Four opposite sides of the outer filler blocks are finished as concave conical surfaces, as indicated at 32 in Figs. 4 and 5, to have surface sliding contact with the top lands of the gears. To form high and low pressure areas or chambers within the shell, the opposite corners of the blocks are finished as convex conical surfaces, as indicated at 33. The surfaces 33 may of course be flat or of any other suitable configuration, but convex conical surfaces will lend themselves more readily to mass-production techniques. The surfaces 33 define, with the inner surface of the shell, the outer surfaces of the filler block 29 and the teeth of the gears, at least substantially to the beginning of the arc of approach, eight symmetrically arranged chambers three of which are designated 60, 61 and 62 in Fig. 1. Four of these chambers will be low pressure and four will be high pressure areas or chambers, functioning interchangeably, however, depending upon the relative direction of rotation of the planetary and driven gears.

It is essential for the operation of the pumping system to interconnect the various chambers. The inner filler block 29 is provided with a central opening 34 which provides a common passage for regulating or throttling the flow of fluid between high and low pressure areas or chambers. Eight other passages, only the four designated 35, 36, 37, and 38 being shown, are symmetrically and radially positioned in block 29 and extend from the opening 34 to the outer surface of the block at points substantially in alinement with the center of each of the aforementioned chambers to connect each chamber with the common passage 34. The shaft 22, upon which the planetary gears 24 and 25 are rotatably mounted, passes through the central passage 34 and fits snugly therein except at the recessed portion 39 which defines, with the inner surface of the passage 34, a restricted common passageway for the flow of fluid to and from the various chambers. A common annular passage (39 and 34) has been shown as being the simplest and least expensive adjustable regulating or throttling means. Adjustment is effected by replacing shaft 22 with one of greater or lesser cross-section at 39, as determined by the torque developed under particular operating conditions.

Such replacement can be made, without dismantling or disturbing the structural relations of the differential gearing, merely by removing snap-rings 51, extracting shaft 22 and inserting a new one and replacing the rings.

It is obvious that other throttling and regulating means can be used. For instance, two or more passages may be formed by fluting shaft 22, and clamping the shaft in such position that the lands between the flutes will cover a certain portion of the inner ends of the radial passages 35—38. It will also be obvious that when the grade of lubricant is changed with changes of ambient temperature, or when a lubricant of relatively constant viscosity such as the known silicones is used, no passageways and no regulating means are required, because the clearance between the outer filler blocks 30 and 31 and the gear faces can be made sufficient to provide the flow required between high and low pressure chambers to control the pressure.

To permit oil in the reservoir or housing 10 to be drawn into such chambers as may at the time be lower pressure chambers, the shell half 15 is provided with four oil inlets, only those designated 42 and 43 being shown in the drawing. These oil inlets communicate with each of the four areas or chambers located under the shell half 15 and are provided with check valves which permit flow of oil only into the shell. A shroud 44 extends about the shell half 15 and projects over the oil inlets. As the shell rotates, some of the oil in the reservoir, is caused to fill up the space between the shroud 44 and the shell by the action of centrifugal force and is constantly supplied under slight pressure to the oil inlets. Thus such of those chambers under the shell half 15 as are then lower pressure chambers will be supplied with oil. In the embodiment here disclosed the shroud 44 is formed integrally with the ring gear 23. However, such integral construction is not necessary as the shroud may be spun or stamped out of sheet metal, with a flange for bolting between the ring-gear and shell flanges and two shrouds may be used, one over each half of the shell. Unless check valves are provided on both sides of the shell, it is however necessary to provide passages 40 and 41 in filler blocks 30 and 31 to equalize the pressure in the various high and low pressure chambers of the several pumps so as to obtain maximum pumping effectiveness and balanced torque. It will be understood that slots in the filler block surfaces may be used instead of passages therethrough.

To prevent rotation of inner filler block 29 and misalinement of the various passageways 35—38 therethrough with their respective chambers, a pin 45 is inserted in the end of the shaft 14 and projects into the surface of the block 29 to key it against rotation about shaft 22. The rotation of block 29 in the plane normal to that of Fig. 2 is prevented, of course, by shaft 22.

Outer filler blocks 30 and 31 may be permitted to float freely in their alotted space, but less wear will result if they are secured to either the shell or the inner filler block, the latter being preferred for ease in assembly. It should be noted that the outer filler blocks 30—31, the inner filler block 29 and shaft 22 can be produced as one integral part to form the spider, but machining thereof will be more difficult. It should also be noted that neither the shell nor the inner filler block which is shown as sphere 29, need be spherical as long as the adjoining surfaces of such parts and the webs of the gears are surfaces of revolution. For instance, such surfaces may be flat but deviation from the spherical will generally increase the cost of manufacture and decrease the efficiency of the unit.

Hemi-spherical liners of spun or stamped sheet metal of suitable composition may be placed between the shell and gears, as indicated at 52 and between the inner filler block and gears, as indicated at 53, to reduce the wear on these parts. If it is desired to use fixed throttling, individual liners may be used over and under each gear, the liner diameters being somewhat smaller than the pitch diameter of the gears, so as to provide a flow or leakage path of fixed dimensions between the high and low pressure sides of the gears.

The modification shown in Fig. 7 is identical to that shown in the other views and heretofore described, except for the use of four planetary gears, designated 46, instead of two, as heretofore described. When four planetary gears are used, two of the planetary gears must be supported on separate or stub shafts, designated generally 47 and are mounted in the shell and in recesses in the inner filler block 48. The through shaft 49 for one pair of planetary gears, however, is substantially identical with the shaft 22 of the first embodiment. In addition, there must also be four outer filler blocks, indicated at 50, in place of the two of the first embodiment. The planetary gears and the filler blocks are constructed substantially identically with those in the first embodiment except that the planetary gears will of necessity have smaller diameters than the driven or side gears and the outer filler blocks will have rectangular axes of different lengths. Inner filler block 48, in place of eight radial passageways extending from the central passage to the surface at the base of the various areas or chambers, will have sixteen such passageways, only eight of which are shown in the drawing. These passageways, like those of the first embodiment, extend to the base of the chambers defined by the various parts.

As assembled, the shaft 22 of the first embodiment, or the shaft 49 of the second modification, may be removed without disassembly or disturbance of structural relations of any of the other parts. Such shafts are merely slid longitudinally from the bearings and any suitable devices, such as snap rings 51, are utilized to hold them in place as described above. As the shafts are an essential element, it may be necessary to empirically revise the amount of restriction to the flow of oil from the high pressure chambers to the low pressure chambers. Such restriction may be easily modified by varying the diameter of the recessed portion 39 of the shafts and either reinserting the shaft as so altered or by inserting other shafts with recesses of different diameters. Thus, it is easy to make a proper adjustment of the restriction of flow. However, as previously stated, other means may be utilized or no provisions at all made for varying the degree of throttling provided in the original factory assembly, except by changing the viscosity of the oil.

In the modification shown in Fig. 8, passages 40, 41 are shown as intersecting in an opening 55 extending from such intersection through the adjacent shell portion. The portion of the opening in the shell is threaded to receive a threaded portion of a needle valve 56. The outer end of the needle valve stem is slotted for reception of a tool for adjusting the position of the valve and the valve may be locked in any given position by a nut 57. It will thus be seen that the degree of throttling between areas of unlike pressure, may be controlled as desired.

The manner in which mechanical force is transmitted by the device is well known and will not be described. However, the operation of the hydraulic system will now be set forth. In normal operation the various passages and chambers (low and high pressure) are charged with oil and the whole operates in a bath of oil received from the reservoir. Oil will be continually furnished to the various inlet openings through the action of centrifugal force urging it into the sloping space defined between the shroud 44 and the shell 15—16. So long as there is no rotation of the shaft 13 relative to the shaft 14, there will be no relative movement of the planetary or driven gears. If one shaft rotates with respect to the other, as when a vehicle turns a corner in normal operation, there will be a relative rotation of the planetary gears and the driven gears. Such rotation of the gears acts in the same manner as a gear pump, and adjacent each side of the arc of action between respective gears there will be respectively a high pressure chamber and a low pressure chamber. The high pressure causes oil flow from the high pressure chamber to the low pressure chamber by way of the common passage defined between the restricted shaft portion 39 and the passage 34 of the filler block 29.

At the low differential speeds occurring in normal operation, the pressure developed and therefore the equalizing torque, is very low. However as the differential speed and therefore the displacement of the pumps increases, the pressure increases exponentially as the speed with an exponent value of approximately two. Such increase occurs for instance, when one driven wheel of a vehicle has adequate frictional contact with the surface and the other is spinning freely in mud or on ice. The differential speed is then greatly increased and the pressure is increased approximately as the square of the speed. Torque proportional to the higher pressure is therefore applied to the stationary wheel, both mechanically and hydraulically, causing it to rotate and transmit tractive power from the engine to the tractive wheel. Without the creation of the above torque, the coupling between the engine and the tractive wheel is effectively broken at the differential and no power can be transmitted to such wheel.

By way of practical example of the present invention under both normal and abnormal operating conditions, assume a differential having four planetary gears and an inside diameter for the shell of 5 inches and for the inner filler block of 2½ inches. The tooth ratio of the driven and planetary gears is assumed to be 16/10. The root to tip distance of the teeth is 17° giving a projected tooth area of approximately .7 sq. in. with a torque-arm of approximately 1.65 inches for the torque produced hydraulically.

Assuming further a vehicle of 3600 pounds gross weight and using 16 x 6.00 tires, traveling at 60 M. P. H. around a curve of 600 foot radius. The differential actually contains eight fluid pumps with a combined displacement of 213 cubic inches per minute under this condition. If the reduced cross-section 39 of shaft 22 is such that the pressure under the above conditions is 3.5 p. s. i., the difference of the tractive effort of the two driven wheels will then be about 1.5 lbs. at the road surface, and the power dissipated as heat in the oil will be approximately .002 H. P.

Now assuming the vehicle to be stationary with one wheel resting on smooth ice and the other wheel blocked by a 6-inch rail. If the propeller shaft is rotating at a speed equivalent to 4 M. P. H., the free wheel will be spinning at 100 R. P. M. and the combined displacement of the eight pumps will be 3800 cubic inches per minute. The hydraulic pressure will be increased to approximately 1100 p. s. i., and will result in a torque sufficient to cause the blocked wheel to climb over the rail. The power dissipated in the oil in this extreme case would amount to 11 H. P. momentarily, and will drop immediately the blocked wheel starts to rotate, or upon temperature rise of the oil sufficient to lower its viscosity and reduce the torque created.

It will thus be seen that the present invention provides differential gearing in which enclosure of the driven and planetary gears within a close fitting shell and substitution of a filler block or blocks for the usual spider, produces a structure in which counter-torques are hydraulically produced exponentially proportional to differential movement of the driven gears. The filler blocks substantially divide the space within the shell into a plurality of areas at different pressures, dependent on the direction of rotation of the driven gears. A simple shroud and ordinary check valves are the only elements required to secure inflow of oil into the low pressure areas defined by the parts within the shell. The throttling of the passages between different pressure areas in the shell may be fixed or adjustable to suit particular operating conditions. Special passages may be provided between different pressure areas, or displacement of the pumped fluid may be by way of clearance between the intra-shell parts. If special passages are provided, the throttling may be adjusted by simple exchange of one element or by adjustably positioning such element.

The present structure provides means by which the power may be transmitted to the one of the drive wheels driven through the differential, which has adequate friction with the road surface even though the other drive wheel has substantially no friction on such surface. The structure is easily manufactured, has only a small number of parts not found in the usual differential and there need be no material increase in size or weight of the present structure as compared to the usual differential.

Although but a few embodiments of the present invention have been illustrated and described, it will be apparent to those skilled in the art that various changes and modifications may be made therein without departing from the spirit of the invention or from the scope of the appended claims.

I claim:

1. In a fluid pressure device for creating counter-torques in differential gearing, driven gears, planetary gears cooperating with the driven gears, a spider substantially filling the space between the inner web surfaces of the gears and the spaces between the lands of the gears and the shell, a fluid reservoir, liners between the outer web surfaces of the gears and the shell and between the inner web surfaces of the gears and the spider, the gears, the shell, the spider and the liners coacting to provide passages for the flow of fluid between areas at different pressures due to rotation of the gears relative to each other.

2. In a fluid pressure device for creating counter-torques in differential gearing, driven gears, planetary gears cooperating with the driven gears, a spider substantially filling the space between the inner web surfaces of the gears and the spaces between the lands of the gears and the shell, a fluid reservoir, the spider having passages therethrough for flow of fluid from high to low pressure areas within the shell upon relative rotation of the gears, and adjustable throttling means in the spider passages for controlling pressures developed upon relative rotation of the driven means.

3. In a fluid pressure device for creating counter-torques in differential gearing, driven gears, a planetary gear interposed between the driven gears, a shell enclosing the gears, a spider comprising an inner filler block substantially filling the space between the inner web surfaces of the gears and an outer filler block substantially filling the space between the lands of the gears, the shell, and the inner filler block, the inner filler block having a plurality of passages therethrough and the outer filler blocks having passages therethrough for equalization of pressure between areas of like pressure, throttling means controlling flow through all of the passages of the inner filler block, and a fluid reservoir retaining fluid for supply to the gearing.

4. In a fluid pressure device for creating counter-torques in differential gearing, driven gears, planetary gears cooperating with the driven gears, a spider substantially filling the space between the inner web surfaces of the gears and the spaces between the lands of the gears and the shell, a fluid reservoir, the spider having passages therethrough terminating in a central passage and providing for the flow of fluid between high and low pressure areas formed in the shell upon relative rotation of the gears, and a single regulating means in the central passage for controlling the flow of fluid through the spider passages.

5. In a fluid pressure device for creating counter-torques in differential gearing, driven gears, planetary gears cooperating with the driven gears, a spider substantially filling the space between the inner web surfaces of the gears and the spaces between the lands of the gears and the shell, the spider having passages therethrough terminating in a central passage, a shaft for mounting the planetary gears in the shell, the shaft extending through the central spider passage and having a portion thereof shaped to cooperate with the first mentioned passages through the spider to form an adjustable regulating means common to all of such passages.

6. In a fluid pressure device for creating counter-torques in differential gearing, driven gears, planetary gears cooperating with the driven gears, a spider substantially filling the space between the inner web surfaces of the gears and the spaces between the lands of the gears and the shell, the spider having passages therethrough terminating in a central passage, a shaft for mounting the planetary gears in the shell, the shaft having a reduced section in the central spider passage for regulating the flow of fluid therethrough, the shaft being mounted in the shell for removal and replacement without disturbance of the relations of the gearing.

7. A fluid pressure device for creating counter-torques in differential gearing comprising a housing forming a fluid reservoir, driven gears, planetary gears associated with the driven gears, a shell enclosing the gears, the shell having openings communicating with a plurality of areas therein, check valves in the openings to permit flow of fluid from the housing into the shell only, a shroud over the openings to trap fluid and hold the fluid over the openings, and a spider comprising inner and outer filler blocks substantially filling respectively the spaces between the inner web surfaces of the gears, the lands of the gears and the shell, the gears, the shell and the spider coacting to define high and low pressure chambers when the gears rotate relative to each other, the outer filler blocks having passages therethrough from chambers with openings thereinto to like pressure chambers without openings.

ISADORE K. DORTORT.

REFERENCES CITED

The following references are of record in the file of this patent:

UNITED STATES PATENTS

| Number | Name | Date |
| --- | --- | --- |
| 1,277,837 | Bilgram | Sept. 3, 1918 |
| 1,529,942 | Bradley | Mar. 17, 1925 |